United States Patent [19]

Yuki et al.

[11] 4,420,415

[45] Dec. 13, 1983

[54] PROCESS FOR THE PRODUCTION OF CARBON MOLECULAR SIEVES

[75] Inventors: Nakaji Yuki, Kukizaki; Hiroshi Kitagawa, Ibaragi, both of Japan

[73] Assignee: Director-General of Agency of Industrial Science & Technology, Tokyo, Japan

[21] Appl. No.: 294,930

[22] Filed: Aug. 21, 1981

[30] Foreign Application Priority Data

Aug. 27, 1980 [JP] Japan ................................ 55-117930

[51] Int. Cl.$^3$ ...................... B01J 20/20; C01B 31/08; B01D 53/02
[52] U.S. Cl. ..................................... 502/180; 55/68; 55/75; 252/444; 264/29.3; 423/445; 423/449
[58] Field of Search ............... 252/421, 444, 445, 425; 423/445, 449; 264/29.3, 29.4, 29.7; 55/68, 75

[56] References Cited

U.S. PATENT DOCUMENTS

| | | | |
|---|---|---|---|
| 3,801,513 | 4/1974 | Munzner et al. | 252/421 |
| 4,046,709 | 9/1977 | Yuki | 252/421 |
| 4,124,529 | 11/1978 | Jüngten et al. | 264/29.1 |
| 4,256,469 | 3/1981 | Leitger | 55/68 |
| 4,264,339 | 4/1981 | Jüngten et al. | 55/68 |

*Primary Examiner*—P. E. Konopka
*Attorney, Agent, or Firm*—Stephen F. K. Yee

[57] ABSTRACT

Carbon molecular sieves having excellent oxygen adsorption properties may be obtained from a vinylidene chloride copolymer. The copolymer is carbonized for the removal of its chlorine components and the resulting char is pulverized. Specific amounts of a carbonaceous sintering agent such as coal tar pitch and an organic binder such as microcrystalline cellulose are then added to the pulverized product and the mixture is shaped into pellets. By thermally treating the pellets under specific conditions in a specific manner, carbon molecular sieves having pore diameters suitable for the adsorption of oxygen may be obtained. The molecular sieves are suitable for concentrating nitrogen in air.

5 Claims, No Drawings

PROCESS FOR THE PRODUCTION OF CARBON MOLECULAR SIEVES

BACKGROUND OF THE INVENTION

This invention relates to a process for the production of carbon molecular sieves having excellent oxygen adsorption properties.

Nitrogen is now widely used in a variety of industries and there is a great demand for an economical method of preparing nitrogen gas. Japanese Published Unexamined Patent Application No. 19595/1979 suggests a method in which molecular sieve coke materials are used for the separation of nitrogen from air. While this method per se is advantageous from economic point of view, the molecular sieve material employed fails to exhibit satisfactory oxygen adsorption properties. In U.S. Pat. No. 4,046,709 issued to one of the present inventors, there is disclosed a process for the production of a carbonaceous granular molecular sieve material from a vinylidene chloride copolymer. Although the molecular sieves produced by this prior art process have an excellent resistance to acids and a sufficient adsorption capacity, the oxygen adsorption properties of the material have been found to be unsatisfactory. Thus, the material cannot be advantageously applied to the concentration of nitrogen in air by selective adsorption of the oxygen.

SUMMARY OF THE INVENTION

The present invention provides an improved process for the production of carbon molecular sieves from a vinylidene chloride copolymer wherein the copolymer is first subjected to carbonization conditions for the removal of its chlorine content as hydrogen chloride. The resulting char is then pulverized to a grain size of 100 mesh or finer. The pulverized char is mixed with a carbonaceous sintering agent and an organic binder and the mixture is pelletized. The thus obtained pellets are carbonized to obtain granular molecular sieves. The improvement involves: the admixing step wherein the sintering agent is used in an amount not greater than 15% but not smaller than 8% based on the weight of the pulverized char and the binder is used in an amount of from 10 to 15% based on the weight of the pulverized char, and the carbonizing step wherein the pellets are heated to a temperature in the range of 750° to 1000° C. at a heating rate of 5° to 7° C./min and the heated pellets are maintained at that temperature for 30 to 90 min.

In another aspect of the present invention, there is provided a carbon molecular sieve material obtained according to the above process.

In a further aspect, the present invention provides a method of concentrating nitrogen in air by selective removal of the oxygen therefrom with the use of a molecular sieve material obtained according to the above process.

It is, therefore, an object of the present invention to provide an economical process for the production of a carbon molecular sieve material from a vinylidene chloride copolymer, especially a recovered waste product of Saran.

Another object of the present invention is to provide a process of the foregoing type by which a carbon molecular sieve material having excellent oxygen adsorption properties can be obtained.

It is a special object of the present invention to provide a novel carbon molecular sieve useful for concentrating nitrogen in air by selective adsorption of the oxygen.

Other objects, features and advantages of the present invention will become apparent from the detailed description of the invention to follow.

DETAILED DESCRIPTION OF THE INVENTION

According to the present invention, carbon molecular sieves may be produced from a copolymer of vinylidene chloride. As the vinylidene chloride copolymer, a copolymer of vinylidene chloride and vinyl chloride or a copolymer of vinylidene chloride and an olefin may be used and the vinylidene chloride content of the copolymer is preferably within the range of from 40 to 95% by weight. It is possible, or rather preferable, to use, as the copolymer, a recovered waste product of Saran (trademark of Dow Chemical Co.) which consists of about 80 to 90% polyvinylidene chloride and various amounts of polyvinyl chloride and plasticizer.

The vinylidene chloride copolymer is first thermally carbonized at a temperature of 500° to 700° C. in an oxygene-free atmosphere for 1 to 5 hours, whereby the chlorine components in the copolymer are converted into hydrogen chloride and removed therefrom to leave a char. The char is cooled and pulverized to a grain size of not larger than 100 mesh (in terms of Tyler mesh).

The pulverized char is then admixed with a sintering agent and a binder and the resulting mixture is pelletized. As the sintering agent, a carbonaceous material derived from petroleum or coal and capable of forming high strength coke upon carbonization, for instance, coal tar pitch, petroleum pitch and coking coal may be used. It is preferred that the sintering agent have a grain size of not larger than 100 mesh. It is important that the sintering agent should be used in an amount smaller than 15% but not smaller than 8% based on the weight of the pulverized char in order to obtain a carbon molecular sieve having pore characteristics suitable for oxygen adsorption. Preferably, the sintering agent is used in an amount of 10 to 14% by weight.

As the organic binder, a tenacious organic substance, which can be partially gasified when heated with the remaining ungasified portion becoming carbonized, for example, microcrystalline cellulose, a liquid resin, waste molasses and a sulfite pulp waste liquor, may be used. The binder should be used in an amount of 10 to 15% based on the weight of the pulverized char. At least 10% by weight is required to impart necessary mechanical strength to the pellets and to prevent the collapse of the pellets during the subsequent carbonization step. Above 15% by weight, however, it becomes difficult to obtain pellets of desired grain sizes. Generally, with the increase in quantity of the binder, the pore diameter of the resultant molecular sieve is increased while the mechanical strength thereof is reduced.

The comingled mixture of the char, sintering agent and binder is then pelletized by any suitable pelletizing machine. Water may be sprayed over the mixture during the pelletizing procedure. By properly selecting the pelletizing conditions, pellets having a desired diameter range such as in the range of 1-2, 2-4, 4-6 or 6-8 mm may be obtained.

The thus obtained pellets are then subjected to specifically controlled carbonization conditions to obtain molecular sieves of the present invention. If necessary, the pellets may be dried before conducting the carbonization. The drying can be performed at a temperature of 100° to 120° C. for 0.5 to 2 hours. Carbonization is conducted by heating the pellets to a temperature in the range of 750° to 1000° C., preferably 800° to 900° C., at a heating rate of 5° to 7° C./min and the heated pellets are maintained at that temperature for 30 to 90 min. Although a heating rate outside the above specific range may be adopted for heating the pellets up to 300° C., it is essential that the heating rate should fall within the range of 5° to 7° C./min from 300° to 1000° C. As will be appreciated from the test results shown hereinafter, the heating rate, heating temperature and period of time for which the heated pellets are maintained at the heating temperature, are all critical to produce the product having the desired oxygen adsorption properties.

The molecular sieve obtained according to the process of the present invention requires no subsequent activating treatment and can be used as such. The molecular sieve of this invention has pore characteristics such that the volume of pores having pore diameters ranging from 4 to 4.3 Å amounts to 80% or more of its total pore volume. In application, the molecular sieve of this invention is packed in a adsorption tower to which air is continuously fed generally under pressure. During its passage through the packed layer of the molecular sieve, the oxygen is selectively adsorbed while allowing the nitrogen to be discharged therefrom. After a certain period of time, the feed of air to the adsorption tower is stopped to perform desorption of the adsorbed oxygen by reducing the pressure within the tower to vacuum. It is possible to recover the desorbed oxygen in the regeneration step. Air is again fed to the tower containing regenerated molecular sieve.

The following example will further illustrate the present invention.

EXAMPLE

The recovered waste product of Saran (vinylidene chloridevinyl chloride copolymer, manufactured by Asahi Dow Co., Ltd.) was carbonized in a carbonizing furnace at 650° C. for 2 hours to obtain a char. The char is then cooled and pulverized to a grain size of 100 mesh or finer. The pulverized char was mixed with coal tar pitch and the binder indicated in Table below in amounts as shown in the Table. The comingled mixture was then pelletized by means of a disk pelletizer while sprinkling a small amount of water over the mixture, whereby pellets having diameters ranging from 1 to 2 mm were obtained. After being maintained at 120° C. for 1 hour for drying, the pellets were heated in a rotary kiln type carbonizing furnace to a temperature as shown in the Table, at a heating rate as shown in the Table, and maintained at that temperature for a period of time as shown in the Table, thereby obtaining nine kinds of carbon molecular sieve.

To examine the oxygen adsorption properties of each of the thus obtained molecular sieves, concentration of nitrogen in air was conducted using an apparatus comprised of two columns, each having an inner diameter of 23 mm and a length of 1000 mm and being packed with respective one of the molecular sieves, a compressor connected to one end of each of the two columns via solenoid valves for feeding air to selective one of the columns under pressure, a gas discharge conduit connected to the other ends of the two columns via solenoid valves, and a vacuum pump connected to the two columns via solenoid valves for sucking the inside of selective one of the two columns. By suitably operating the solenoid valves, adsorption and desorption were simultaneously conducted with the apparatus having the above construction. Air was continuously fed to selected one of the columns under a pressure of 5 kg/cm$^2$ for one minute for the adsorption of the oxygen and the treated gas was discharged therefrom at a flow rate of 25 Nm$^3$/min, while the other column was maintained under about 5 mm Hg or below for the desorption of the oxygen adsorbed in the previous step. Then, the valves were operated so that air was fed for another one minute to said other column containing the regenerated molecular sieve for effecting oxygen adsorption while said first column was subjected to a regeneration step for the desorption of oxygen. In like manner, each of the two columns was alternately subjected to adsorption and desorption conditions, enabling continuous production of nitrogen gas. An oxygen analyzer was provided in the discharge conduit for continually measuring the concentration of oxygen in the discharged gas. The results obtained with each of the molecular sieves were as shown in the Table below.

TABLE

| Experiment No. | Amount of coal tar pitch [wt %]*1 | Binder | Amount of binder [wt %]*1 | Heating rate [°C./min] | Heating temperature (carbonizing temp.) [°C.] | Carbonization time [min] | Oxygen*4 content [vol %] |
|---|---|---|---|---|---|---|---|
| 1 | 5 | A*2 | 10 | 5 | 850 | 60 | 7.0 |
| 2 | 10 | A | 10 | 5 | 850 | 60 | 0.3 |
| 3 | 13 | A | 10 | 7 | 850 | 60 | 0.5 |
| 4 | 13 | A | 10 | 15 | 850 | 60 | 2.0 |
| 5 | 10 | B*3 | 10 | 7 | 850 | 60 | 0.5 |
| 6 | 10 | B | 10 | 2.5 | 1000 | 30 | 2.0 |
| 7 | 10 | B | 10 | 7 | 1000 | 30 | 0.1 |
| 8 | 20 | B | 10 | 7 | 1000 | 60 | 1.7 |
| 9 | 30 | B | 10 | 7 | 1000 | 30 | 11.3 |

Remarks:
*1Based on the pulverized char.
*2A: Sulfite pulp waste liquor (Solids content: 46.8 wt %, Ash content: 5.1%)
*3B: Microcrystalline cellulose (trade name: Abicel manufactured by Asahi Kasei Co., Ltd.)
*4Average value

We claim:

1. In a process for the production of carbon molecular sieves, including the steps of subjecting a vinylidene chloride copolymer to carbonization conditions for the removal of its chlorine component as hydrogen chloride, pulverizing the resulting product to a grain size of 100 mesh or finer, admixing the pulverized product with a carbonaceous sintering agent and an organic binder to obtain a mixture, pelletizing the mixture, and carbonizing the resulting pellets, the improvement comprising:

said admixing step, wherein said sintering agent includes a carbonaceous material derived from petroleum or coal and capable of forming a high-strength coke upon carbonization, is used in an amount of 10 to 14% based on the weight of said pulverized product and is a member selected from the group consisting of coal tar pitch, petroleum pitch and coking coal, and said organic binder is used in an amount of from 10 to 15% based on the weight of said pulverized product and includes a tenacious organic substance capable of being partially gasified when heated, with the remaining ungasified components being carbonized, and is selected from microcrystalline cellulose, a liquid resin, waste molasses and a sulfite pulp waste liquor, and said step of carbonizing said pellets, wherein said pellets are heated to a temperature in the range of 750° to 1000° C. at a heating rate of 5° to 7° C./min and then maintained at that temperature for 30 to 90 min;

said molecular sieve having at least 80% of its total pore volume in pores with diameters of 4 to 4.3 Å.

2. The process according to claim 1, wherein said vinylidene chloride copolymer comprises a vinylidene chloride-vinyl chloride copolymer.

3. The process according to claim 1, wherein said step of subjecting said copolymer to carbonization conditions comprises heating said copolymer at a temperature of 500° to 700° C. in an oxygen-free atmosphere for 1 to 5 hours.

4. The process according to claim 1, wherein said sintering agent has a grain size of 100 mesh or finer.

5. The process according to claim 1, wherein the heating of said pellets up to 300° C. is carried out at any optional heating rate and the heating of said pellets above 300° C. is carried out at a heating rate of 5° to 7° C./min.

* * * * *